Feb. 9, 1954   J. R. BELKNAP   2,668,702
HYDRAULIC SCALE

Filed May 16, 1951   2 Sheets-Sheet 1

Inventor
JOEL R. BELKNAP
By
Attorney

Feb. 9, 1954  J. R. BELKNAP  2,668,702
HYDRAULIC SCALE
Filed May 16, 1951  2 Sheets-Sheet 2
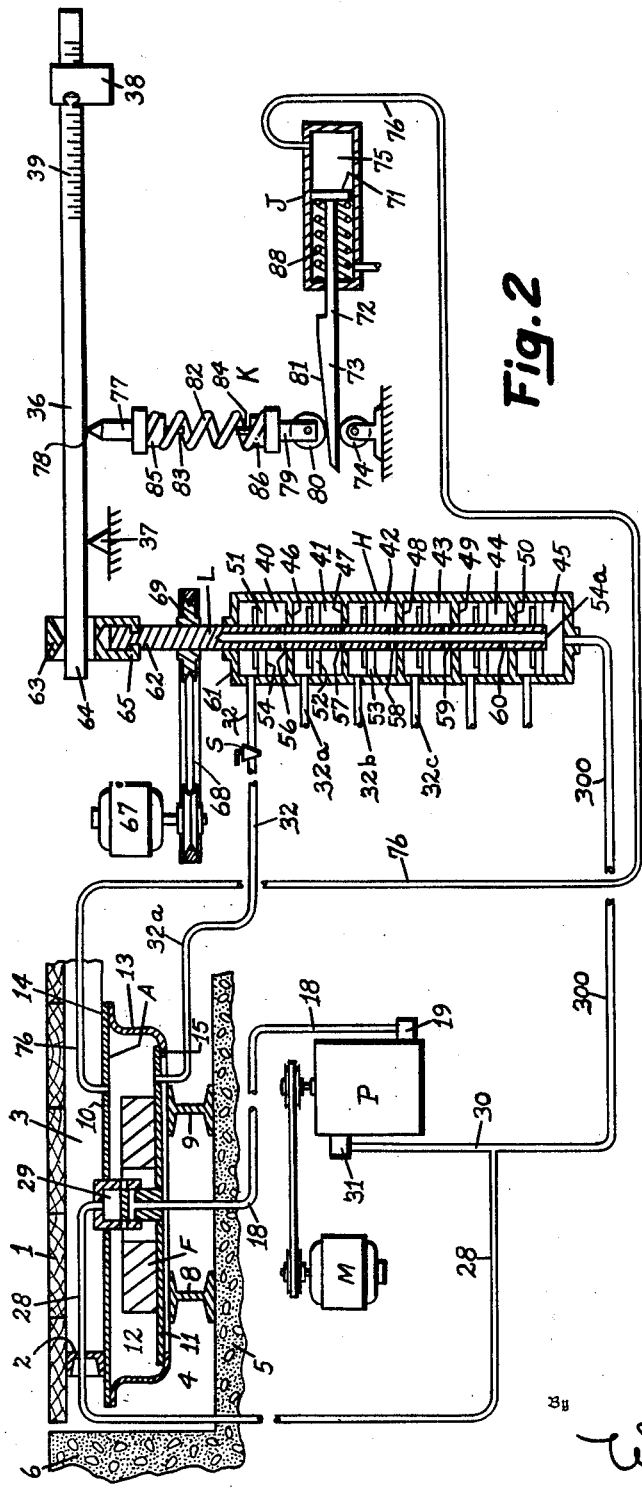
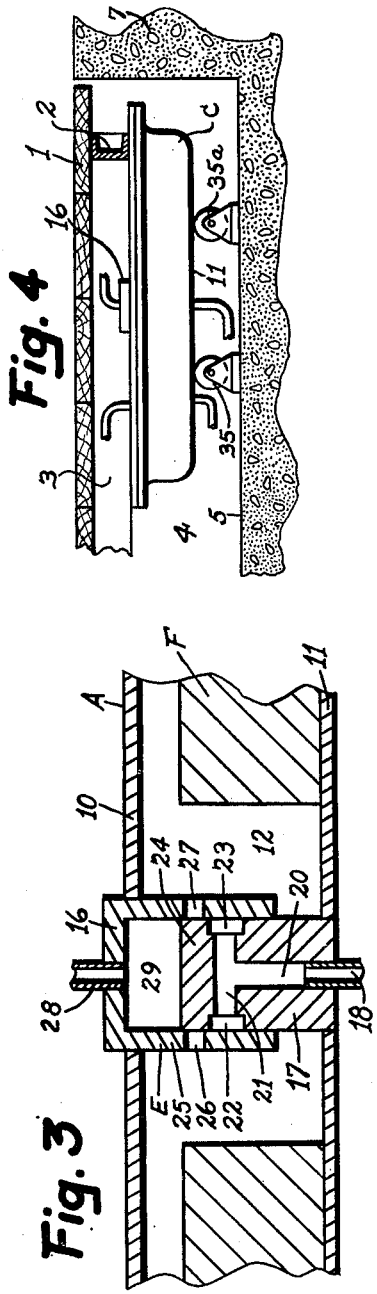
Inventor
JOEL R. BELKNAP
By W. H. Pattison
Attorney Patented Feb. 9, 1954

2,668,702

UNITED STATES PATENT OFFICE 2,668,702

HYDRAULIC SCALE

Joel R. Belknap, South Charleston, W. Va., assignor to Fuel Process Company, South Charleston, W. Va.

Application May 16, 1951, Serial No. 226,710

6 Claims. (Cl. 265—47)

This invention relates to a hydraulic scale utilizing a closed system in that the liquid used is confined in the system and particularly pertains to a type of scale ordinarily known or referred to as a platform scale utilized for weighing heavy articles or vehicles such as railroad cars, trucks and trailer trucks.

It is common knowledge that large capacity scales, that is, scales for weighing heavy articles or vehicles are highly inaccurate and the primary object of the present invention is the provision of a large capacity platform scale which will accurately determine and visually indicate heavy weights.

Another object of the invention is the provision of a scale which will operate accurately to determine the over all weight of a vehicle or will optionally determine and indicate the axle weight of a vehicle.

A further object of the invention is to provide a hydraulic scale embodying a compensating mechanism for correcting any inaccuracies of the scale brought about by the load sensing elements of the scale.

A still further object of the invention is the provision of a hydraulic scale embodying a novel and highly efficient load weight totalizing and transmitting unit.

Another and further object of the invention is the provision of a hydraulic scale which is comparatively simple of construction and therefore easy and comparatively cheap of manufacture.

Other objects and advantages of the invention will appear from the following description when read in the light of the accompanying drawings which illustrate an embodiment of the inventive concept but it is to be understood that departures from the specific constructions illustrated can be made without departing from the invention.

In the drawings:

Fig. 2 is a view partly in side elevation and partly in vertical section illustrating the scale.

Fig. 3 is a fragmentary enlarged vertical sectional view through the automatic valve of the weight sensing element illustrated in Fig. 2.

Fig. 4 is a view in side elevation, parts being shown in vertical section, illustrating a support which permits movement of certain of the weight sensing elements.

Figure 1:
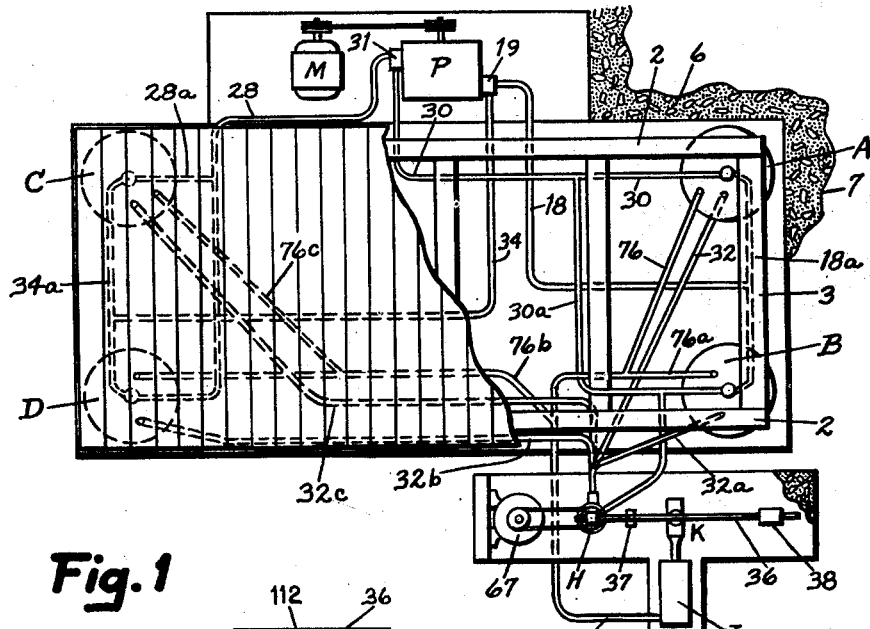
Fig. 1 is a plan view, with parts broken away and parts in section, of a weighing scale embodying the invention.

The scale platform 1 having a supporting frame made up of longitudinal and transverse beams 2 and 3 is disposed in a pit 4 having a bottom 5 and side and end walls 6 and 7.

The platform supporting frame is at one end supported upon weight sensing elements A and B disposed under its corners which are in turn supported, as will be hereinafter described, upon suitable beams 8 and 9 resting upon the bottom 5 of the pit. These weight sensing elements are stationary in respect to the pit.

The opposite end of the platform supporting frame is supported at its opposite corners on weight sensing elements C and D and by reference to Fig. 4, specific description of which will hereinafter be given, it will be seen that these elements are movably supported upon the pit bottom 5. The purpose of mounting the sensing elements C and D for movement in the pit is to accommodate expansion and contraction of the platform supporting frame in response to temperature changes.

The weight sensing elements described will, in combination with its associated apparatus, to be hereinafter described, provide for weighing an entire vehicle on the platform or either the front or rear end of such a vehicle. For a six or more wheeled vehicle oppositely positioned additional weight sensing elements can be provided and positioned at any desired point intermediate the length of the platform so as to get more specific weight readings.

In operation the system of the hydraulic scale is filled with a fluid under pressure. The fluid is delivered by a suitable pump P driven by a suitable power means such as an electric motor M. The construction of the pump is not critical and is therefore not specifically illustrated. It would preferably include a liquid storage tank as a part thereof or the tank could be a separate and distinct element which ever was found to be preferable.

Referring to Figs. 1 to 3, inclusive, the weight sensing elements A and B, which are identical in nature, comprise an upper plate 10 and a lower plate 11 arranged in spaced parallel relationship and both being preferably circular in configuration with the lower plate being of less diameter than the upper plate. A closed chamber 12 is provided between the plates by a flexible diaphragm 13 having its peripheral edges connected securely to the upper and lower plates 10 and 11 as at 14 and 15. The connection between the diaphragm and the plates is liquid tight.

Each of these sensing members includes a valve E made up of a cylinder or cap 16 suitably secured to and movable with the upper plate 10 and a piston 17 suitably secured to the lower plate 11. A fluid conducting tube or conduit 18 with its branch 18a extends from the delivery side 19 of the pump P to the piston 17 for delivery of fluid under pressure to the longitudinal bore 20 of the piston. A transverse bore 21 communicates with the bore 20 and has outlets 22 and 23 at opposite sides of the piston below the head 24 thereof. The side walls 25 of the cylinder 16 are provided with oppositely positioned ports or passageways 26 and 27 which can move into and out of registry or communication with the piston outlets 22 and 23. Conduits 28 and 30 and their branch conduits 28a and 30a connect the piston chambers 29 to the suction side 31 of the pump.

A ring-like block F is disposed in the chamber 12 of the weight sensing element. When there is no pressure in this chamber the top plate 10 can move downwardly under the weight of the scale platform and its supporting frame until the underside of the plate contacts the upper face of the block F. With the parts in this position the ports 26 and 27 of the cylinder are in communication with the outlets 22 and 23 of the piston.

Each of the chambers 12 of the weight sensing elements are connected by individual conduits 32, 32a, 32b, 32c with the weight totalizing and transmitting unit H in a manner which will hereinafter be described.

Conduits 76, 76a, 76b and 76c extend from the chambers 12 of the weight sensing elements to the cylinder J of a compensator K the precise construction and operation of which will be hereinafter described.

Conduits 18 and 34 with their branch conduits 18a and 34a connect all of the chambers 12 of the weight sensing elements with the pressure delivery side 19 of the pump.

It has been mentioned that the weight sensing elements C and D are movable with the supporting frame of the scale platform. Provision for this movement is in the form of rollers 35 and 35a having engagement with the bottom plates 11 of these elements.

The weight of the vehicle or article on the scale platform is determined and then visually indicated by a scale beam 36 pivotly supported intermediate its length at 37 and provided with the usual and conventional sliding weight 38 movable over or along the weight indicating scale 39 on the sides of the beam.

The weight totalizing and transmitting unit comprises the elongated housing H having therein a plurality of piston chambers 40, 41, 42, 43, 44 and 45. Six piston chambers are illustrated to provide an arrangement for six weight sensing devices but with a scale having only four sensing devices only four piston chambers would be used or a housing having therein only four piston chambers would be provided.

To provide the several piston chambers the housing H is interiorly provided with a plurality of spaced apart cylinder heads 46, 47, 48, 49 and 50. Each of the conduits 32 to 32c are individually connected with an individual piston chamber, see Fig. 2, at a point above the respective pistons 51, 52, 53 and 54 therein.

The pistons are carried by and movable with a piston rod L. That portion of the piston rod within the housing H and carrying the pistons is hollow as at 54 and has an open lower end 54a. The rod communicates with each piston chamber, at a point beneath the piston therein, through a pair of oppositely positioned ports 56, 57, 58, 59 and 60. The lowermost piston chamber 45 is connected to the suction side 31 of the pressure pump by the tubing or conduit 300.

The piston rod L extends upwardly and outwardly through and beyond the upper end 61 of the housing H and has its outer end 62 connected to a yoke 63 or the like which encircles the end 64 of the scale beam. The connection 65 between the yoke and the piston rod permits axial rotation of the rod and this rotation is provided by power means such as an electric motor 67 having driving connection through a belt 68 with a pulley 69 fixed to the end 62 of the piston rod.

The motor 67 is in operation at all times during the operation or use of the scale as rotation of the pistons in their respective cylinders within the housing H is essential to accurate weight totalizing and transmission to the scale beam. Should it prove desirable, provision could be made so that the motor 67 would oscillate rather than rotate the piston rod. The pistons are accurately machined. The rotation or oscillation of the pistons serve to greatly reduce the effects of friction in their upward and downward movement as well as to overcome the effect of particles or impurities in the hydraulic fluid which impurities would otherwise tend to obstruct free movement of the pistons. Any leakage past the pistons enters the hollow piston rod and is drawn off from the lowermost piston chamber 45 by the conduit 30 which has connection to the suction side of the pressure pump P.

It has been found that the weight sensing elements A, B, C and D do not give or reflect exactly a straight-line relationship between the weight acting upon their upper plates 10 and the hydraulic pressure within their chambers 12. The reason for this appears due to distortion of the diaphragms 13 under the higher pressures. It will be understood that as pressure is delivered to the chambers 12 there is not only the possible distortion of the diaphragms but also as the upper plates 10 rise the contours or shapes of these diaphragms will change thus changing the interior configuration of the chambers and the volumetric capacity of them. As a result of this deviation in straight line relationship between the weight and the hydraulic pressure I provide a compensator or corrector.

The compensator is designated as an entirety by K and includes in addition to the cylinder J other mechanism which will now be specifically described.

The cylinder J has therein a piston 71 provided with an outwardly extending piston rod 72 having on its outer end an inclined cam 73 the bottom or non-cam surface of which is movable over a roller 74. The piston chamber 75 in back of the piston head is connected by the conduit 76 with the chamber 12 of the weight sensing element A. Branch conduits 76a, 76b, and 76c, having connection with the conduit 76, communicate with the chambers 12 of the weight sensing elements B, C and D.

A stub shaft 77 engages the underside of the weight beam 36 at a point 78 intermediate the pivotal support 37 of the beam and the sliding weight 38. A second stub shaft 79 carries a roller 80 having engagement with the cam face 81 of the cam 73. A coil spring 82, which is under compression, inter-connects the stub shafts 77 and 79. The stub shafts 77 and 79 at their inner opposed ends are provided with externally threaded stems 83 and 84 respectively which carry the nuts 85 and 86. These nuts are exteriorly threaded to fit the convolutes of the coil spring 82 as clearly appears in Fig. 2. By rotation of the nuts 85 and 86 the number of active convolutions or coils of the spring can be reduced as desired thus adjusting the pressure of the spring, that is, will make the spring stiffer or more flexible Adjustment of this spring will make the scale beam have greater or lesser sensitivity.

A coil spring 88 resists the outward movement of the piston 71 and is for the purpose of definitely positioning the piston and the cam 73 proportional to the hydraulic pressure in the piston chamber 75 of the cylinder J.

It is to be noted that the compensator K tends to lift upwardly on the scale beam thus acting against the downward pressure or force of the weight 38. This is due to the fact that it has been found that such error in the scale as results from the distortion of the diaphragms 13 is a recording of an underweight of the article being weighed. The shape of the cam is determined by a calibration of the scale with test weights and the cam shape and setting or adjustment of the springs of the compensator are made so that the deviation between the pressure in the weight sensing units and the actual load is corrected.

Figures 5, 6, 7:
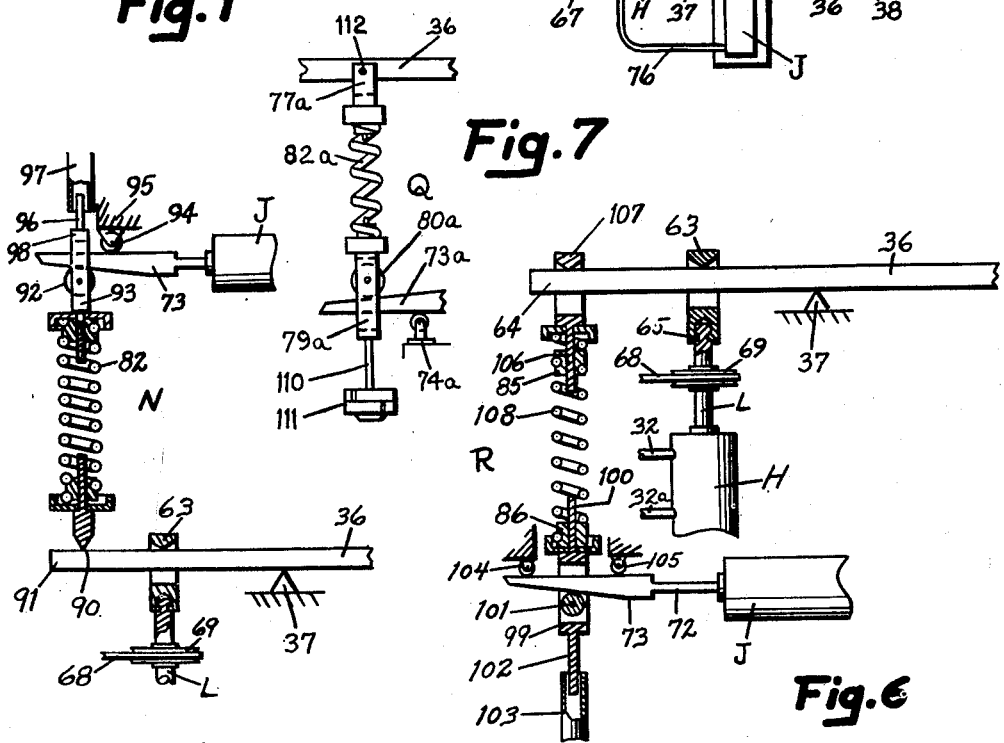
Fig. 5 illustrates a modified form of compensator, a portion of the view being in vertical section.
Fig. 6 illustrates a still further form of compensator, portions of view being in vertical section.
Fig. 7 illustrates a construction for compensating against an overweight reading by the scale.

The compensator need not be positioned exactly as illustrated in Fig. 2. It can be positioned as illustrated in Fig. 5 wherein it is given a designation as an entirety by N and will be seen to be above and under pressure engagement at 90 with the scale beam end 91 on the opposite side of the pivotal support 37 of the beam. Structurally the compensator N differs little from the compensator K. The same cam 73 rides between a roller 92 carried by the upper stub shaft 93 and a roller 94 carried by an immovable abutment 95. The stub shaft 93 is provided with a pin 96 at its outer end which travels in a guide 97. The stub shaft 93 above the roller 92 is preferably provided with a yoke-like part 98 which serves as a guide for the cam. In this arrangement, like that previously described, the spring 82 is under pressure.

A still further embodiment of a compensator is illustrated in Fig. 6 and as designated as an entirety by R. In this instance there is the same cylinder J, piston rod 72, and cam 73. The cam operates through the yoke 99 carried by the lower stub shaft 100 and engages the roller 101 in the yoke. The yoke is provided with an extending pin or arm 102 which slides in a guide 103. The upper non-cam face of the cam engages fixed rollers 104 and 105. An upper stub shaft 106 is provided with a yoke 107 encircling the end 64 of the scale beam 36 on the opposite side of its pivotal support 37 to the engagement of the beam by the weight 38. In this instance the coil spring 108 is under tension the degree of which can be adjusted by the hereinbefore referred to and described spring engaging nuts 85 and 86.

The compensator K of Fig. 2 tends to lift the weight beam against the force exerted upon the beam by the weight 38. The compensator N of Fig. 5 by pushing downwardly on the extending end of the weight beam also tends to lift the beam against the force exerted by the weight 38. The compensator R of Fig. 6 by pulling down upon the extending end of the weight beam also tends to lift the beam against the force exerted upon the beam by the weight 38. Thus it will be seen that compensators differently positioned and utilizing compression or tension springs can be utilized for correcting any deviation of underweight indicated or recorded by the scale.

The valves E of the weight sensing units or elements are automatic in operation. When the scale is not in operation the upper plates of these elements will rest upon the block F and when in this position the ports 26 and 27 of the valve pistons will be in communication with the outlets 22 and 23 of the pistons 17. When a vehicle or article to be weighed is on the scale platform the pump motor M is started and pressure is immediately delivered to the chambers 12 of the weight sensing elements and their upper plates 10 will rise to the position illustrated in Fig. 3. At this time ports 26 and 27 and the pressure within the chambers 12 is transmitted through the several conduits 32, 32a, 32b and 32c to their respective piston chambers in the cylinder or housing H of the weight totalizing and transmitting unit. Should there, for any reason, be a fall in pressure in the chambers 12 of the weight sensing units their plates 10 will move downwardly which will again bring the ports 26 and 27 into communication with the piston outlets 22 and 23. Hydraulic pressure would again flow into chambers and lift their upper plates until they again assume the position illustrated in Fig. 3. Upon the removal of the weight from the scale platform or upon a reduction in the weight upon the scale platform the upper plates of the weight sensing elements will rise above the position illustrated in Fig. 3 which will result in the ports 26 and 27 of the cylinder 16 rising above the piston head 24. This movement will provide communication between the chambers 12 and the piston chambers 29. Pressure in the chambers 12 will then immediately be drained off through the conduits 28, 28a, 30 and 30a which are connected to the suction side of the pump. The upper plates 10 of the weight sensing elements will then be caused to return to their predetermined weighing position which is that illustrated in Fig. 3.

From the preceding description it should be clearly evident and understood that the weight of the article or vehicle on the scale platform exerts a pressure upon the several chambers 12 of the weight sensing elements and that this pressure is transmitted to the several individual cylinders of the housing H at a point above the pistons therein. This pressure moves the pistons and the piston rod L downwardly thus pulling downwardly upon the end 64 of the scale beam. Manipulation of the scale beam weight G will determine the weight which is upon the scale platform. Although they are not specifically illustrated in respect to each of the conduits 32, 32a, 32b, and 32c, a valve S is illustrated in the conduit 32. Similar valves would be placed in the remaining above mentioned conduits and by closing off the proper valves the component weights of a load, for example the load of each axle of a truck, can be measured. Measurement of the load on a particular axle of a truck or other vehicle is a highly desirable attribute of a scale. By reason of the conduit 300 connected respectively to the suction side of the pump and the bottom piston chamber 45 of the unit H the space or area beneath each of the pistons of this unit is maintained at atmospheric pressure.

Conditions might be such that a compensation against an overweight reading by the scale could be necessary. Provision for this is made by the arrangement illustrated in Fig. 7 which is substituted for the underweight compensator illustrated in Fig. 2 of the drawings.

The spring 32a is connected to the scale beam 36 through the stub shaft 77a which is pivoted to the beam at 112. The opposite end of the spring is connected to the stub shaft 79a which carries a roller 89a which is held in engagement with the cam 73a by a weight 111 suspended from the stub shaft by a rod 110. The weight is sufficient to insure that the roller follows the cam. The cam is movable over the roller 74a and is actuated as explained in respect to the previously described cam 73. The spring provides adjustability in the manner previously described.

What I claim is:

1. A scale comprising, a load supporting platform, a plurality of hollow expansible and collapsible weight sensing elements supporting the platform, each of said elements embodying upper and lower plates connected by a flexible diaphragm to form a liquid tight chamber, the lower plates being supported upon bases and the upper plates engaging the load supporting platform, a piston in each chamber and having therein an inlet passageway having ports communicating with the interior of the chamber, a cylinder carried by the top plate of each sensing element and telescopically receiving the piston, each cylinder being provided with ports adapted to register with the ports of the piston, a source of fluid pressure communicating with the piston passageway, the pistons and cylinders acting as a valve to automatically control the delivery of fluid pressure to the chambers, a weight beam pivoted intermediate its length and carrying at one end a weight movable along the beam, a housing having therein individual piston chambers totaling in number the same as the number of weight sensing elements, a piston rod in said housing and carrying in each piston chamber a piston, a fluid conducting conduit inter-connecting the chamber of each weight sensing element with one of said housing piston chambers at a point above the piston therein, and the piston rod being operatively connected to the opposite end of the weight beam for pulling downwardly thereon.

2. A scale comprising, a load supporting platform, a plurality of hollow expansible and collapsible weight sensing elements supporting the platform, a power driven fluid pressure generating device having a fluid pressure outlet side and a suction intake side, a scale beam, a weight totalizing and transmitting unit operatively connected to the scale beam to pull downwardly thereon against the force exerted by the scale beam weight, said unit comprising a plurality of cylinders each having a piston therein and a piston rod interconnecting said pistons, a weight inaccuracy compensating unit operatively connected to the scale beam to push upwardly thereon to overcome in part the downward pressure exerted by the scale beam weight, said unit including a piston operatively connected to the scale beam, the weight totalizing and transmitting unit and the compensator being hydraulically operated, conduits for delivery of fluid pressure from the generator thereof to the interior of each weight sensing element, a conduit extending from the interior of each weight sensing element to a cylinder of the weight totalizing and transmitting unit to actuate the piston therein, conduits extending from the interiors of the weight sensing elements to the cylinder of the compensating unit, the parts operating whereby the pressure within the weight sensing elements is transmitted to and interpreted by the scale beam to indicate the weight on the scale platform.

3. A construction as defined in claim 2 wherein, normally closed conduits interconnect the interiors of the weight sensing elements with the suction side of the fluid pressure generator, and means opening communication of said conduits with the said weight sensing elements when the elements have expanded beyond a pre-determined degree.

4. A construction as defined in claim 2 wherein, each weight sensing element is provided with a valve controlling communicating between the interior of the element with the delivery side of the fluid pressure generator, said valves remaining open until the elements have expanded to a pre-determined degree, normally closed conduits connecting the interior of each weight sensing element with the suction side of the fluid pressure generator, and said valves opening said conduits when the weight sensing elements have expanded beyond a pre-determined degree.

5. A scale comprising, a load supporting platform, a plurality of hollow expansible and collapsible weight sensing elements supporting the platform, a source of fluid pressure communicating with the interiors of said elements for expanding them, a weight beam pivoted intermediate its length and carrying at one end a weight movable along the beam, a totalizing and transmitting unit operatively connected to the opposite end of weight beam for pulling downwardly thereon, the totalizing and transmitting unit comprising a housing having therein a plurality of piston chambers each having a piston therein connected to a piston rod, the piston rod being connected to the said opposite end of the said beam, a fluid pressure conducting conduit extending from each of the chambers of the weight sensing elements to one of said housing piston chambers and communicating therewith at a point above the piston therein, that portion of the piston rod within the housing being hollow and provided with an open lower end, the hollow piston rod having communication with each piston chamber at a point below the piston therein, the open lower end of the piston rod communicating with a piston chamber, and said last named piston chamber provided below the piston therein with a fluid pressure escape outlet passageway.

6. A scale comprising, a load supporting platform, a plurality of hollow expansible and collapsible weight sensing elements supporting the platform, a source of fluid pressure communicating with the interiors of said elements for expanding them, a weight beam pivoted intermediate its length and carrying at one end a weight movable along the beam, a totalizing and transmitting unit operatively connected to the opposite end of weight beam for pulling downwardly thereon, the totalizing and transmitting unit comprising a housing having therein a plurality of piston chambers each having a piston therein connected to a piston rod, the piston rod being connected to the said opposite end of the said beam, a fluid pressure conducting conduit extending from each of the chambers of the weight sensing elements to one of said housing piston chambers and communicating therewith at a point above the piston therein, a fluid pressure operated compensating mechanism which comprises, a cam, means interconnecting the cam and the scale beam at a point intermediate the pivotal support of the beam and the weight carried thereby, fluid pressure responsive means for moving said cam to cause the same to push upwardly on the scale beam, and fluid conducting conduits extending from the chambers of the weight sensing elements to said fluid pressure responsive means.

JOEL R. BELKNAP.

References Cited in the file of this patent

UNITED STATES PATENTS

| Number | Name | Date |
|---|---|---|
| 566,698 | Raab | Aug. 25, 1896 |
| 2,341,174 | Bohannan | Feb. 8, 1944 |
| 2,403,204 | Feld | July 2, 1946 |
| 2,472,689 | Adams | June 7, 1949 |
| 2,482,027 | Poole | Sept. 13, 1949 |
| 2,602,658 | Williams | July 8, 1952 |

FOREIGN PATENTS

| Number | Country | Date |
|---|---|---|
| 29,347 | Great Britain | 1913 |
| 465,587 | France | Apr. 20, 1914 |